United States Patent [19]

Spurgin

[11] 4,231,766
[45] Nov. 4, 1980

[54] TWO STAGE ELECTROSTATIC PRECIPITATOR WITH ELECTRIC FIELD INDUCED AIRFLOW

[75] Inventor: Wendell P. Spurgin, Cincinnati, Ohio

[73] Assignee: United Air Specialists, Inc., Cincinnati, Ohio

[21] Appl. No.: 968,100

[22] Filed: Dec. 11, 1978

[51] Int. Cl.³ ............................ B03C 3/08; B03C 3/12
[52] U.S. Cl. ................................ 55/138; 55/149; 361/230
[58] Field of Search ........................... 55/128–130, 55/136–138, 149; 310/308, 309; 315/111.9; 361/230; 417/48; 313/357, 361

[56] References Cited

U.S. PATENT DOCUMENTS

| | | | |
|---|---|---|---|
| 1,549,753 | 8/1925 | Edler | 55/149 |
| 1,888,606 | 11/1932 | Nesbit | 55/129 |
| 2,279,586 | 4/1942 | Bennett | 310/308 |
| 2,295,152 | 9/1942 | Bennett | 55/138 |
| 2,316,901 | 4/1943 | Thomay | 310/308 |
| 2,327,588 | 8/1943 | Bennett | 310/308 |
| 2,765,975 | 10/1956 | Lindenblad | 417/48 |
| 3,054,553 | 9/1962 | White | 417/48 |
| 3,374,941 | 3/1968 | Okress | 55/136 |
| 3,518,462 | 6/1970 | Brown | 55/138 |
| 3,554,669 | 1/1971 | Reader | 417/48 |
| 3,638,058 | 1/1972 | Fritzlus | 315/111 |
| 3,699,387 | 10/1972 | Edwards | 315/111 |
| 3,751,715 | 8/1973 | Edwards | 417/48 |
| 3,896,347 | 7/1975 | Gelfand | 55/112 |

FOREIGN PATENT DOCUMENTS

| | | | |
|---|---|---|---|
| 731535 | 2/1943 | Fed. Rep. of Germany | 310/309 |
| 99669 | 1/1962 | Norway | 55/136 |

OTHER PUBLICATIONS

The Ion Wind or Electrostatic Pump, Lau Blower Company, Dayton, Ohio, 10/19/1959.

*Primary Examiner*—David L. Lacey
*Attorney, Agent, or Firm*—Frost & Jacobs

[57] ABSTRACT

A two stage electrostatic precipitator air cleaner having electric field induced airflow. A plurality of spaced parallel fin-like accelerator plates charged to a relatively high negative potential are positioned between the positively charged ionizer wires and the collecting stage of the air cleaner. The electric field induced between the accelerator plates and the ionizer wires induces an airflow for bringing the particles charged by the ionizer wires into proximity with the collecting stage while at the same time charging particles aspirated by the airflow.

17 Claims, 9 Drawing Figures

TWO STAGE ELECTROSTATIC PRECIPITATOR WITH ELECTRIC FIELD INDUCED AIRFLOW

BRIEF SUMMARY OF THE INVENTION

The operation of Penney-type two stage electrostatic precipitator air cleaners is well known in the art and need only be briefly described. In this type of air cleaner, a plurality of ionizer electrode wires charged with a relatively high electrical potential producing a strong electrostatic field, charge airborne particles passing into the inlet end of the air cleaner. In one type of electrostatic precipitator air cleaner the particles are directed between a plurality of spaced parallel charged plates interleaved with a plurality of parallel grounded collecting plates located in the collecting cell or stage of the electrostatic precipitator. In those air cleaners which utilize ionizing wires of the same polarity as the charged plates, the charged particles are repelled toward the grounded plates where they become attached, resulting in a clean airflow from the outlet of the air cleaner.

In order to provide the required airflow through the ionizing and collecting stages of the two stage electrostatic precipitator air cleaner, a motor driven blower is often employed. However, when the air cleaner is employed in relatively quiet areas such as offices or home residences, the noise level associated with the air blower may be objectionable. In addition, energy savings resulting from the relatively low energy demands of the electrostatic precipitator itself may be partially offset by the power required by the blower to move the air through the air cleaner. Finally, the air cleaner enclosure must be sized to accommodate the blower, which heretofore has prevented the use of such devices in areas where space is at a premium.

The two stage electrostatic precipitator air cleaner of the present invention eliminates the need for a separate blower to move air through the air cleaner by using an electric field to induce airflow. It has been known for some time that a point source having a high electrical potential of one polarity spaced from an electrode of opposite polarity can be used to produce a flow of air between the electrodes. It has also been observed that a charged wire proximate an oppositely charged wire mesh produces similar results. This phenomenon has sometimes been referred to as an "electric wind" or "ionic wind".

While the exact mechanism by which this process takes place is not fully understood, it is believed to be due to the production of charged air ions which are accelerated away from a charged ionizer toward a passive electrode. Air ions generated in this manner may strike other air molecules resulting in an overall cumulative affect whereby an airflow is generated by the electrostatic field existing in the region between the oppositely charged electrodes. If the forces involved are not exactly balanced in all directions a motion of the air or "electric wind" results.

In one embodiment of the electrostatic precipitator air cleaner of the present invention, a plurality of spaced parallel elongated vane-like accelerator plates, charged to an electrical potential of opposite polarity from the ionizer wires, are positioned between the ionizer wires and the inlet end of the collecting stage of the precipitator. This arrangement produces a substantial electric field between the ionizer wires and the accelerator plates which results in an airflow whereby air is drawn past the ionizing wires so that particles contained in the airstream acquire an electrical charge as in a conventional two stage electrostatic precipitator air cleaner. Since the accelerator plates or passive electrodes are located downstream from the ionizer wires, substantially all of the forces on the air ions have a large component in the direction of the desired air movement. In this way an adequate airflow is produced without the need for noisy motor driven blowers as in past designs. Any dirt particles aspirated with the air movement become charged by the airflow producing electric field and are conveyed into the collecting stage of the precipitator where the particles are deposited on the ground plates.

In a preferred embodiment, the leading edge of each accelerator plate is rounded and larger in size than the associated ionizer wire to produce the desired electric field, while the trailing edge of each accelerator plate is tapered to present minimal resistance to the airflow.

In another embodiment, the accelerator plates are eliminated and the ionizer wires positioned outwardly from the leading edges of the collecting stage plates so that an electric field is produced therebetween which not only establishes an electric field tending to move air through the collecting stage, but also charges particles aspirated by the electric field induced airflow.

BRIEF DESCRIPTION OF THE DRAWING

FIG. 6 is a schematic diagram showing one form of ionizer wire and accelerator plate placement.

DETAILED DESCRIPTION

The electrostatic precipitator of the present invention, shown generally at 1, comprises an electrically conducting box-like enclosure 2 having an inlet opening 3 at one end and an outlet opening 4 at the opposite end (see FIG. 3), resulting in a rectangular shaped duct-like passageway through the enclosure. It will be understood that enclosure 2 may be provided with a protective covering, not shown, to reduce shock hazard, and limit access to the interior of the precipitator.

Located within enclosure 2 is a plurality of generally imperforate spaced parallel thin electrically conducting collecting plates, one of which is shown at 5, arranged parallel to the direction of airflow through enclosure 2. Plates 5 are electrically interconnected by four spaced rod-like conducting separators, one of which is shown at 6, which separate the plates from each other and from the sides of enclosure 2. The outermost ends of conducting separators 6 are attached to the outer walls of enclosure 2 by electrically conducting fasteners 6a or the like. It will be observed that this arrangement places enclosure 2 and the conducting collecting plates 5 at the same electrical potential.

Interleaved with collecting plates 5 is a plurality of generally imperforate spaced parallel thin electrically conducting charged plates, one of which is shown at 7, electrically insulated from collecting plates 5. As illustrated, charged plates 7 will generally be shorter and narrower than collecting plates 5, although this arrangement may be varied as required. Charged plates 7 are separated and interconnected electrically by means of four spaced rod-like electrically conducting separators, one of which is shown at 8, which pass through cooperating coaxial apertures 5a collecting plates 5. Conducting separators 8 are attached to the sides of enclosure 2 by means of threaded fasteners or the like 9, and are insulated therefrom by suitable non-conducting grommet-like insulators 10. It will be understood that alternative insulating means may be used provided adequate isolation is maintained.

Figure 1:
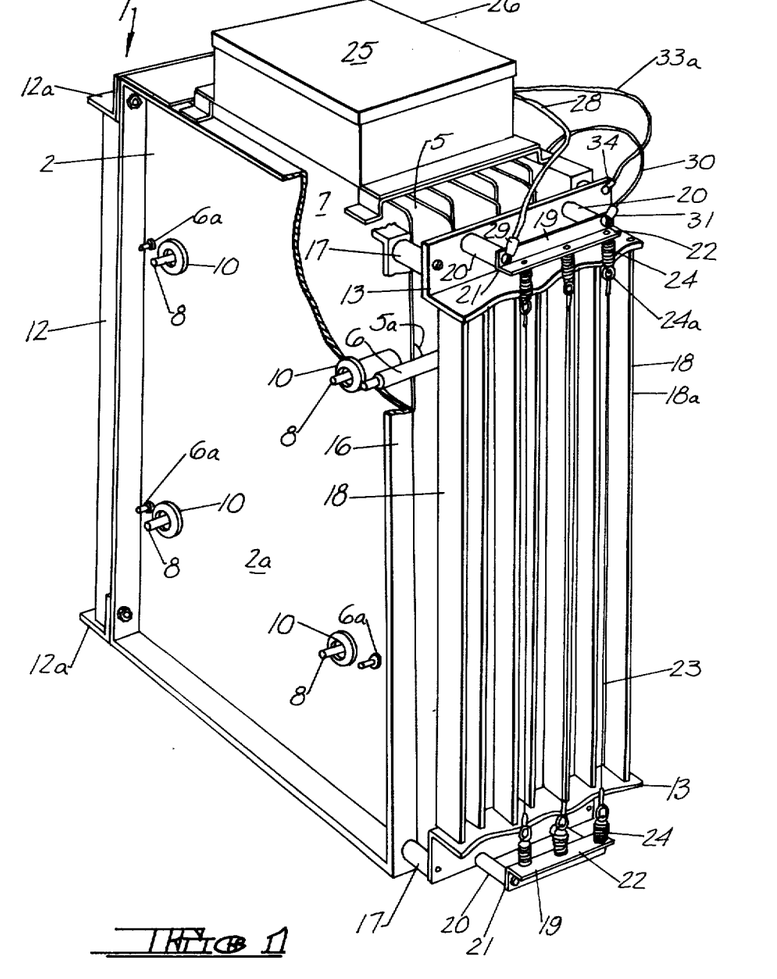
FIG. 1 is a perspective view, partially cutaway, of the electrostatic precipitator of the present invention.
Figure 2:
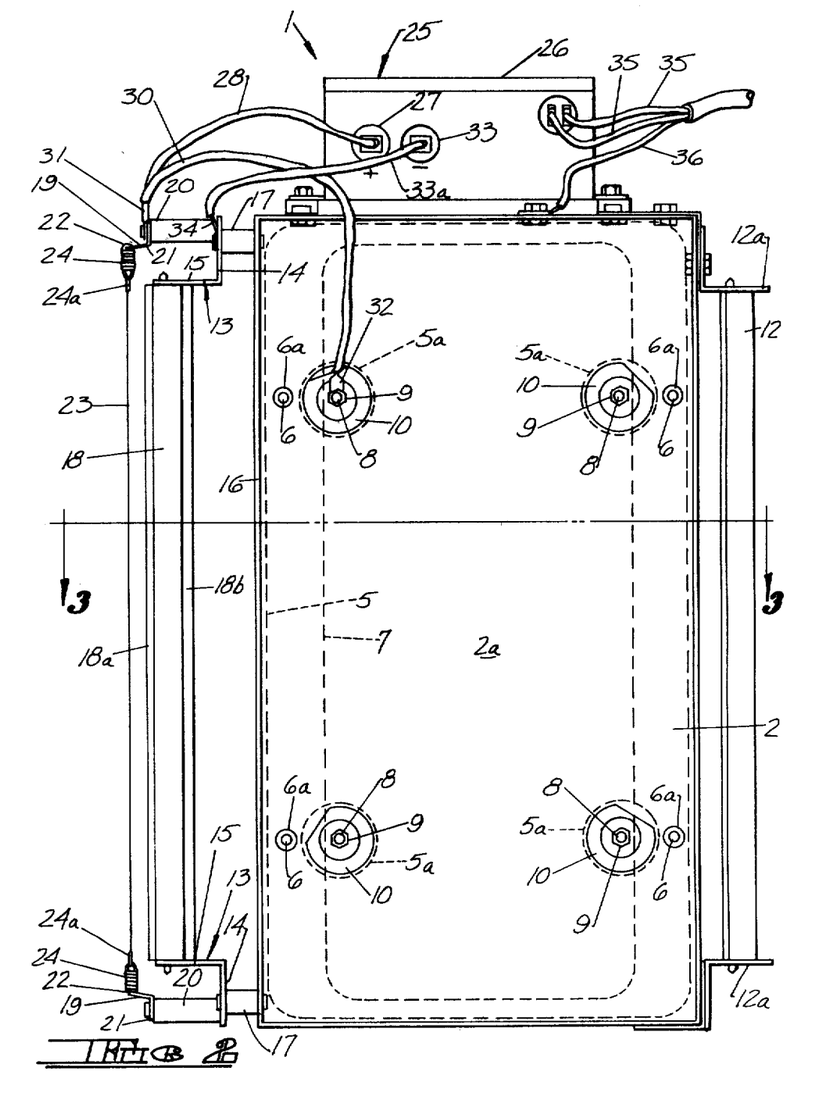
FIG. 2 is a side elevational view of the electrostatic precipitator of the present invention.
Figure 3:
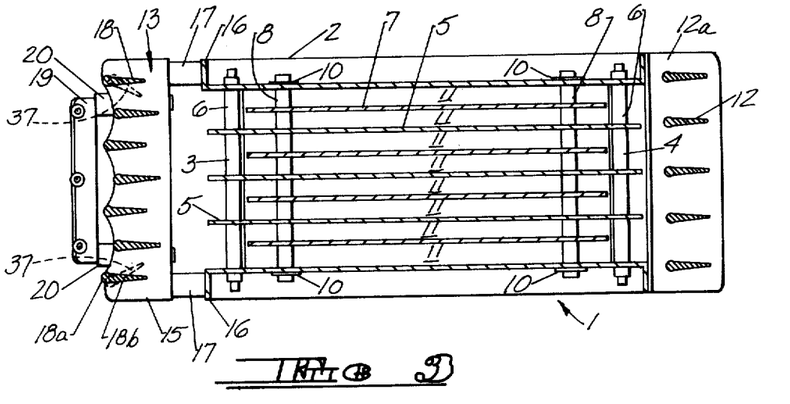
FIG. 3 is a section view taken along lines 3—3 of FIG. 2.
Figure 4:
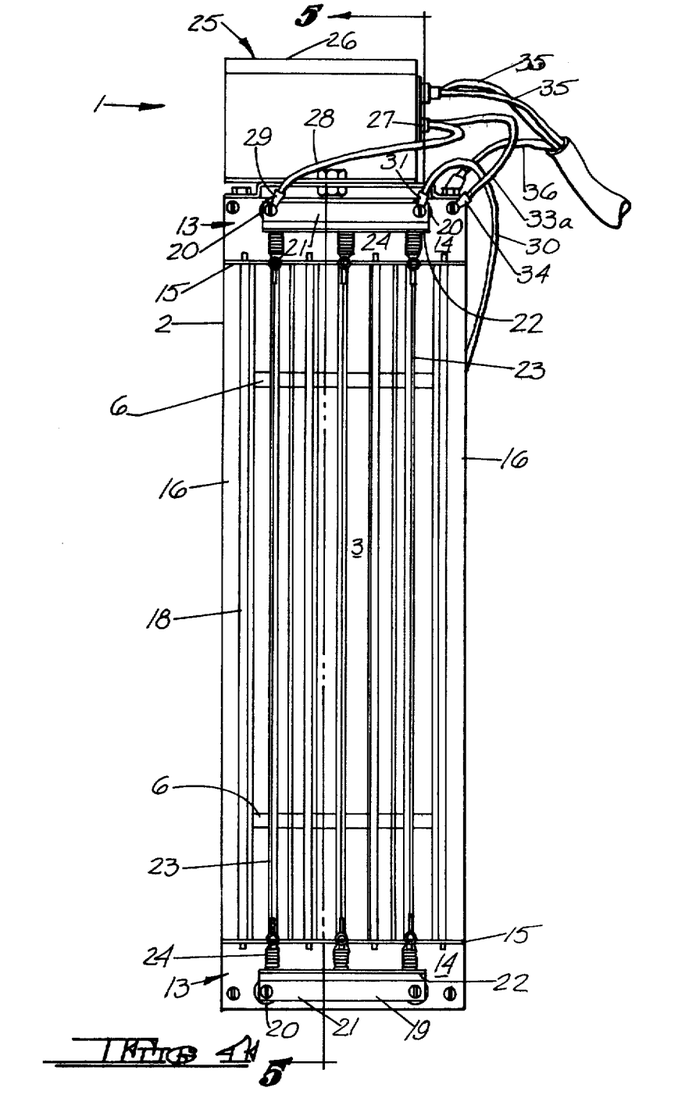
FIG. 4 is a front elevational view of the electrostatic precipitator of the present invention.
Figure 5:
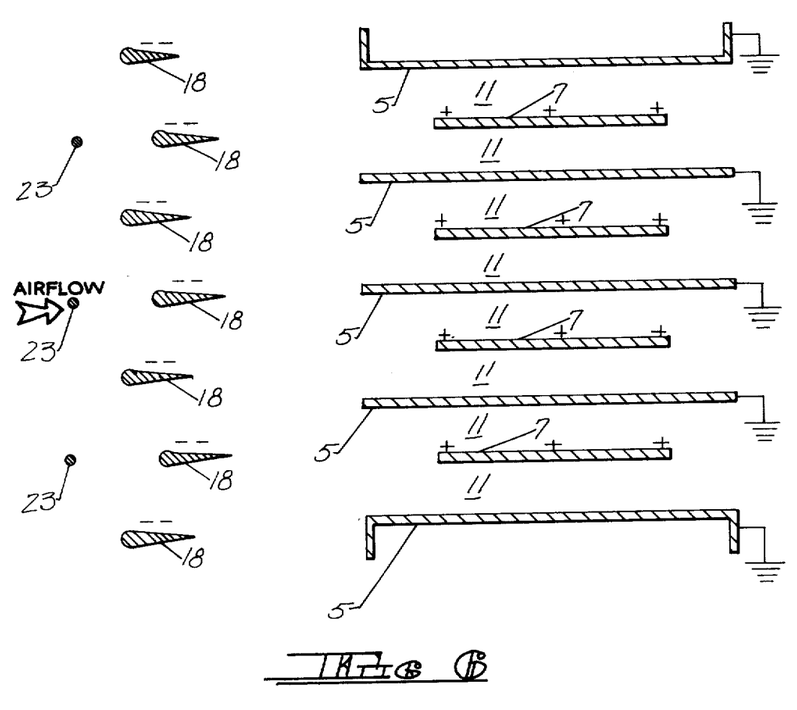
FIG. 5 is a section view taken along section lines 5—5 of FIG. 4.

It will be observed that this arrangement produces a plurality of parallel air passageways 11 located between adjacent collecting and charged plates and extending between inlet opening 3 and outlet opening 4 of enclosure 2, as is best shown in FIG. 3.

Outlet opening 4 may be provided with a plurality of spaced elongated air directing vanes 12 which are pivotally secured between a pair of spaced outwardly directed flange-like supports 12a so as to be adjustable to direct air exhausted from outlet opening 4 in the desired direction. Vanes 12 are airfoil-shaped in cross section to provide minimum resistance to the airstream issuing from the precipitator, with the tapered end of the vane facing away from outlet opening 4.

The inlet opening 3 of enclosure 2 is provided with a pair of spaced angle-shaped mounting brackets 13 positioned at the upper and lower ends of opening 3. Each bracket includes a leg portion 14 extending substantially parallel to inlet opening 3, and a leg portion 15 extending outwardly from the innermost end of leg portion 14 in a direction substantially parallel to the direction of airflow. Mounting bracket 13 is secured to flanges 16 which extend outwardly from the sides of enclosure 2 adjacent inlet opening 3 by a cylindrical insulator 17 positioned between flange 16 and leg portion 14, insuring that mounting bracket 13 is electrically insulated from enclosure 2.

Extending between leg portions 15 of oppositely disposed mounting brackets 13 is a plurality of parallel spaced elongated electrically conducting vane-like accelerator plates 18. Each plate 18 is substantially airfoil-shaped in cross section and includes a rounded forward portion 18a and a rearwardly extending tapered fin-like plate portion 18b adjacent inlet opening 3. The shape of plates 18 is important to the efficient functioning of the present invention as will be explained in more detail hereinafter. Plates 18 may be positioned in staggered relationship in the direction of airflow as shown in FIG. 6 as will be described in more detail hereinafter. Accelerator plates 18 are pivotally secured to mounting brackets 13 so as to be adjustable in order to control the direction of flow toward the collecting stage in a manner similar to that described hereinbefore for outlet vanes 12.

A second smaller angle-shaped mounting bracket 19 is mounted on the outwardly directed surface of leg portion 14 of mounting brackets 13 by means of a pair of spaced cylindrical insulators 20. Mounting bracket 19 contains a leg portion 21 substantially parallel to leg portion 14 and an outwardly directed leg portion 22 extending from the innermost edge of leg portion 14 substantially parallel to leg portion 15. Insulators 20 and mounting bracket 19 are so dimensioned that the outermost edge of leg portion 22 extends beyond the leading rounded edges of accelerator plates 18. It will be observed that this arrangement insures that mounting bracket 19 is electrically isolated from mounting bracket 13.

Extending between the outermost edges of oppositely disposed mounting brackets 19 is a plurality of spaced parallel fine electrically conducting ionizer wires 23 secured to mounting bracket 19 by means of tension springs 24 which serve to maintain ionizer wires 23 at the proper tension. Each straight ionizer wire 23 is attached to a corresponding spring 24 by means of an electrically conducting eyelet 24a secured to the end of ionizer wire 23 and passing through a cooperating loop formed in the end of spring 24. A similar loop in the opposite end of spring 24 passes through a cooperating aperture in leg portion 22 of mounting bracket 19 to hold spring 24 in place. It will be observed that this arrangement insures an electrically conducting path between mounting bracket 19 and ionizer wires 23. As is well understood in the art, each ionizer wire 23 has a small radius of curvature which produces a high electrical field in order to cause electrical breakdown of the air and thus provide a source of air ions in the interelectrode space between ionizer wires 23 and accelerator plates 18.

A power pack 25 is enclosed in box-like enclosure 26 mounted atop precipitator enclosure 2 and produces relatively high voltages of positive and negative polarity. Voltage produced by the positive polarity output 27 of power pack 25 is conducted by means of electrical conductor 28 to a terminal 29 located on mounting bracket 19. An electrical conductor 30 extends between a terminal 31 on the opposite end of mounting bracket 19 and terminal 32 secured to one end of conducting separator 8 connecting charged plates 7. Thus relatively high voltage of positive polarity may be supplied simultaneously to ionizer wires 23 through mounting bracket 19 and to charged plates 7 through conducting separators 8.

The negative polarity output terminal 33 of power pack 25 is connected to mounting bracket 13 through electrical conductor 33a by means of terminal 34 to provide a relatively high voltage of negative polarity on accelerator plates 18. In this matter a substantial potential difference producing a significant electrostatic field is produced between ionizer wires 23 and accelerator plates 18.

Primary power is supplied to power pack 25 from a conventional source of alternating current by means of electrical conductors 35. Earth ground is supplied to collecting plates 5 as well as box-like electrostatic precipitator enclosure 2 by means of ground wire 36.

For purposes of an exemplary showing, the electrostatic precipitator of the present invention uses four charged plates 7 and three collecting plates 5, with the outermost sides 2a of enclosure 2 also acting as grounded collecting plates. A spacing of approximately 0.5 inches is maintained with an impressed positive DC voltage of approximately 6 Kv. on charged plates 7.

For purposes of an exemplary showing, in the arrangement shown, one accelerator plate 18 charged to a DC voltage of negative 6 Kv. is used for each charged and collecting plate with a spacing between accelerator plates of approximately 0.75 inches. Three ionizer wires of approximately 0.007 inch diameter and charged to a DC voltage of approximately 6 Kv. are spaced at substantially equal distances across the inlet end of the air cleaner. A spacing of approximately 0.75 inches between ionizer wires 23 and accelerator plates 18 creates a sufficient electrostatic field to produce an adequate airflow through the air cleaner. It will be understood that specific dimensional or voltage potential alterations may be made as required. For example, any combination of voltage polarities or potential levels may be utilized which insures that a properly polarized electric field of sufficient strength will be produced between ionizer wires 23 and accelerator plates 18 to induce air movement toward the collecting stage as well as charge particles aspirated by the airflow. For example, a combination of negative ionizer wires and positive accelerator plates, or positive ionizer wires and grounded accelerator plates, or ionizer wires and accelerator plates of different positive voltage potentials, etc. may be used, with the corresponding changes being made in the relative polarities and voltage potential levels of the collecting stage.

Figure 7:
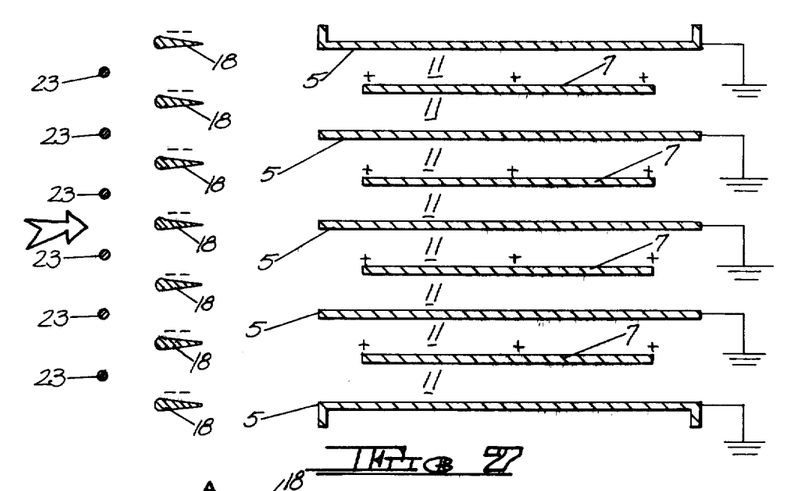
FIG. 7 is a schematic diagram showing an alternative form of ionizer wire and accelerator plate placement.

In operation, when primary power is applied to power pack 25, a relatively high voltage of the order of 6 Kv. of positive polarity is impressed on the ionizer wires 23 and charged plates 7, while a relatively high negative voltage of approximately 6 Kv. is impressed on accelerator plates 18. In this preferred embodiment a positive voltage is impressed on ionizer wires 23 to minimize ozone production. The potential difference of 12 Kv. existing between ionizer wires 23 and accelerator plates 18 produces a substantial electric field in this region, which leads to an airflow as described hereinabove in a direction tending to move the air and any particles carried thereby toward the collecting stage. As shown in FIG. 6, in order to insure that the field is relatively constant in this area, accelerator plates 18 are staggered in the direction of airflow so as to maintain a substantially constant spacing between ionizer wire 23 and each accelerator vane 18. However, the alternative arrangement of FIG. 7 may be used where each ionizer wire 23 is spaced equidistant from two accelerator plates 18. In either configuration, particles aspirated by the airflow created by the electric field produced between the ionizer wires and accelerator plates must pass through the field and in so doing acquire an electric charge as in a conventional electrostatic precipitator air cleaner.

It will be observed that accelerator plates 18 are constructed in the form of thin elongated fin-like plates having a rounded forward edge 18a and a tapered trailing edge 18b so as to provide sufficient surface area to produce the necessary electric field as well as minimize air resistance. The rounded leading edge 18a of accelerator plate 18 will generally be designed to have a radius of curvature greater than the radius of curvature of ionizer wire 23 in order to minimize back corona and resistance to airflow while providing sufficient surface area to produce the desired electric field. It has been found that an accelerator plate having a leading edge with a radius of curvature about 15-17 times the radius of curvature of ionizer wire 23 produces satisfactory results. In general, the electric field will be a function of the potential difference and spacing between the ionizer wire and the accelerator plates, as is well understood in the art. This field may be adjusted as desired to produce the required airflow while maintaining the production of ozone at an acceptably low level. It will be further understood that to a certain extent particles charged positive by ionizer wires 23 will be attracted to and deposited upon accelerator plates 18, thereby furnishing some air cleaning capability before the particles enter the collecting stage of the electrostatic precipitator as in a conventional Cotrell precipitator. However, in the present invention, the primary particle collection occurs in the collecting stage of the precipitator so that the air cleaner exhibits the overall performance of a Penney-type precipitator with the additional advantage of electric field induced airflow. It has been found that the vane-like shape of accelerator plates 18 and the relatively constant spacing from ionizer wires 23 tend to equalize the amount of particles collected on the accelerator plates. Furthermore, accelerator plates 18 may be made adjustable as described hereinabove to direct the flow of air toward the charging section. That is, the outermost accelerator plates may be inclined inwardly as shown by the dashed lines 37 in FIG. 3.

Figure 8:
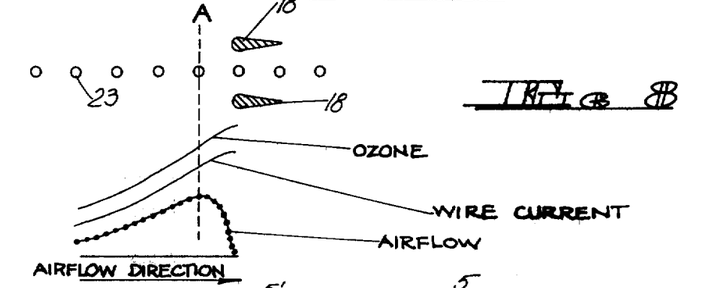
FIG. 8 illustrates the variation of airflow, ozone production and ionizer current with ionizer wire placement.

FIG. 8 illustrates the variation of performance with ionizer wire placement with respect to the accelerator plates 18. For the preferred embodiment described, airflow increases as the ionizer wire is moved toward the accelerator plates, peaking when the ionizer wire is positioned approximately one quarter of the accelerator plates spacing in front of the plates. At the same time, ionizer wire current and ozone production increases, reaching a maximum level when the ionizer wire is positioned midway between the leading and trailing edges of the accelerator plates. It has been found that maximum performance representing a compromise among adequate airflow, acceptable ozone level, and long ionizer wire life as a result of minimal ionizer wire current, is achieved when the ionizer wire is positioned on the upstream side of the maximum airflow position at approximately the location designated A in FIG. 8. However, it will be understood that sufficient spacing must be maintained between the ionizer wires and the accelerator plates to preclude the possibility of arcing between these components.

Figure 9:
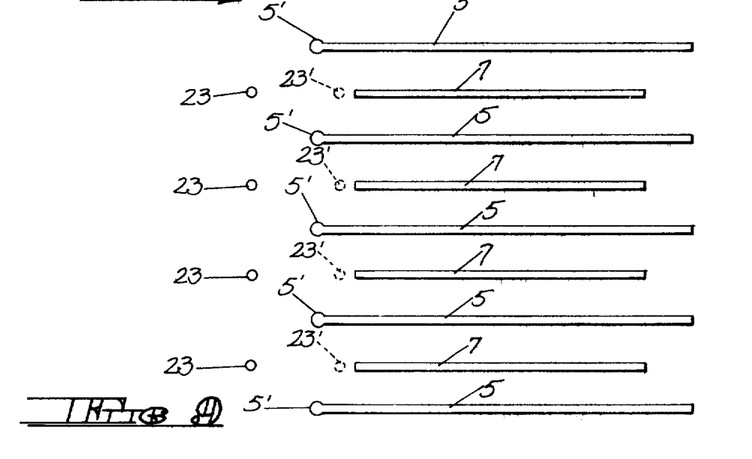
FIG. 9 is a schematic diagram showing an alternative form of ionizer wire placement.

FIG. 9 illustrates an embodiment of the present invention where accelerator plates 18 have been eliminated altogether. In a conventional Penney-type electrostatic precipitator construction, including spaced collecting and charged plates 5 and 7, respectively, the ionizer wire designated by dashed lines 23' in FIG. 9, will be positioned inwardly of the upstream edges of collecting plates 5 adjacent the leading edge of charged plate 7. In this manner an adequate electric field will be produced to charge particles drawn into the precipitator by an external air moving force, such as a blower fan, not shown. With this arrangement, however, the electric field tends to circulate the air ions around ionizer wire 23', rather than producing an airflow parallel to the charging and collecting plates.

In the present invention, on the other hand, ionizer wire 23 has been moved outwardly to the position shown in FIG. 9, where it lies spaced from the leading edges of collecting plates 5. It is contemplated that an electric field will be produced between ionizer wire 23 and collecting plate 5, such as charging ionizer wire 23 to a positive voltage potential while maintaining collecting plate 5 at a ground potential. This electric field will not only tend to produce the air movement described in connection with the aforementioned embodiments, but will also tend to charge any particles aspirated between the ionizer wire and the collecting plates as a result of the electric field induced airflow. In some cases, it may be desirable to provide collecting plate 5 with a rounded edge such as that shown at 5′ in FIG. 9, having a radius of curvature larger than the radius of curvature of ionizer wires 23, in order to produce the desired electric field.

As described hereinabove, it is understood that various combinations of polarities and voltage potential levels may be utilized for ionizer wire 23, collecting plate 5, and charged plate 7 in order to produce the desired electric fields. In a preferred embodiment, charged plate 7 and ionizer wire 23 will be given positive charges, while collecting plate 5 will be held at a ground potential. Alternatively, collecting plate 5 may be charged negatively, to produce a higher field strength and hence increased airflow.

It will be understood that various changes in the details, materials, steps and arrangements of parts, which have been herein described and illustrated in order to explain the nature of the invention, may be made by those skilled in the art within the principle and scope of the invention as expressed in the appended claims.

What we claim is:

1. In an electrostatic precipitator air cleaner of the type having a plurality of spaced collecting plates for collecting charged particles, the spaces between said plates forming passageways having an inlet end and an outlet end, one or more ionizers positioned adjacent said inlet end, and means for charging said ionizers to a relatively high first electrical potential, the improvement comprising accelerator means positioned between said ionizers and said inlet end for producing a relatively strong electric field in the region between said ionizers and said inlet end tending to move air through said passageways and to charge particles aspirated by said moving air.

2. The air cleaner according to claim 1 wherein said accelerator means comprises one or more electrodes.

3. The air cleaner according to claim 2 wherein said ionizer comprises a thin elongated wire.

4. The air cleaner according to claim 3 wherein each of said electrodes comprises an elongated fin-like plate oriented substantially parallel to said ionizer wires.

5. The air cleaner according to claim 4 wherein the forward edge of said accelerator plate facing said ionizer wire is rounded.

6. The air cleaner according to claim 5 wherein the radius of curvature of said rounded edge is greater than the radius of curvature of said ionizer wire.

7. The air cleaner according to claim 6 wherein the radius of curvature of said rounded edge is at least fifteen times the radius of curvature of said ionizer wire.

8. The air cleaner according to claim 5 wherein the rear edge of said accelerator plate is tapered to minimize air resistance.

9. The air cleaner according to claim 4 wherein said fin-like plates are arranged in parallel spaced relationship.

10. The air cleaner according to claim 4 wherein at least one of said fin-like plates is arranged in non-parallel relationship with the remaining fin-like plates to direct said moving air toward said inlet end.

11. The air cleaner according to claim 4 including adjustable support means supporting at least one of said fin-like plates so that said fin-like plate is adjustable so as to vary the direction of said moving air toward said inlet end.

12. The air cleaner according to claim 4 including a plurality of said ionizer wires wherein the forward edge of each of said fin-like plates facing said ionizer wire is spaced an equal distance from two of said fin-like plates.

13. The air cleaner according to claim 4 including a plurality of said ionizer wires wherein the forward edge of each of said fin-like plates facing said ionizer wires is spaced an equal distance from three of said fin-like plates.

14. The air cleaner according to claim 4 wherein said ionizer wire is spaced from the forward edge of said fin-like plate facing said ionizer wire a distance corresponding to about one quarter the distance between adjacent fin-like plates.

15. The air cleaner according to claim 2 wherein said accelerator means includes means for charging said electrodes to a second electrical potential.

16. The air cleaner according to claim 15 wherein said second electrical potential is of opposite polarity from said first electrical potential.

17. The air cleaner according to claim 1 wherein said collecting means and said ionizer means are positioned so that said field produced is non-parallel to the desired direction of said air movement.

* * * * *